July 20, 1965  E. B. CONNELLY  3,195,383
FEED CONTROL SYSTEM FOR A MACHINE TOOL
Filed March 29, 1962  2 Sheets-Sheet 2
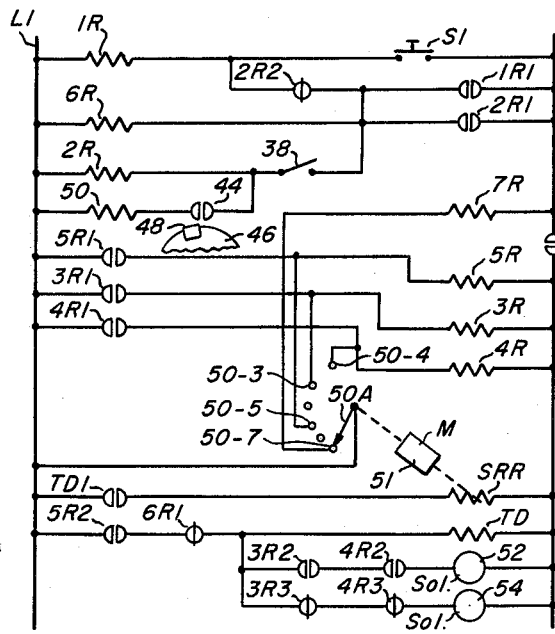
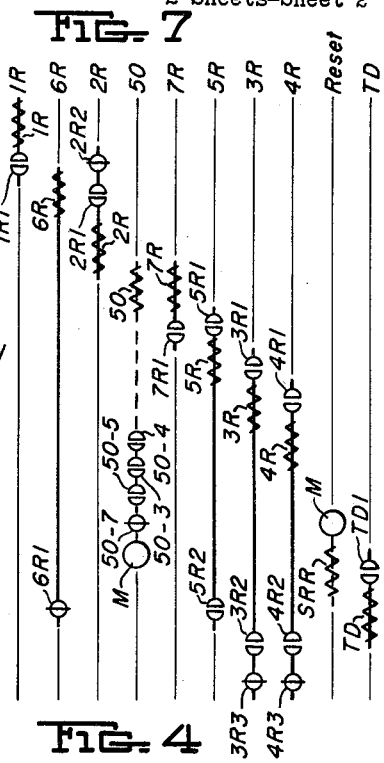
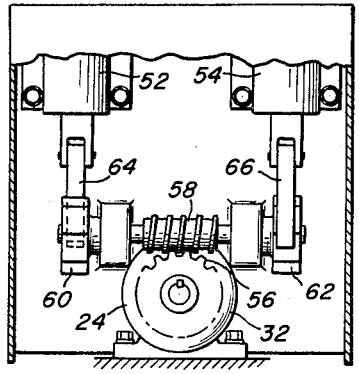
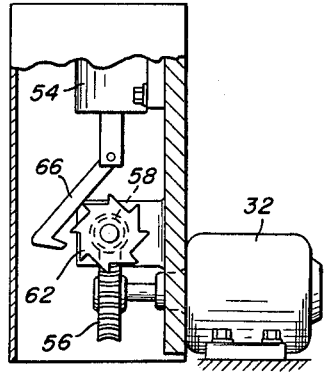
INVENTOR
EUGENE B. CONNELLY
By Donald G. Dalton
Attorney

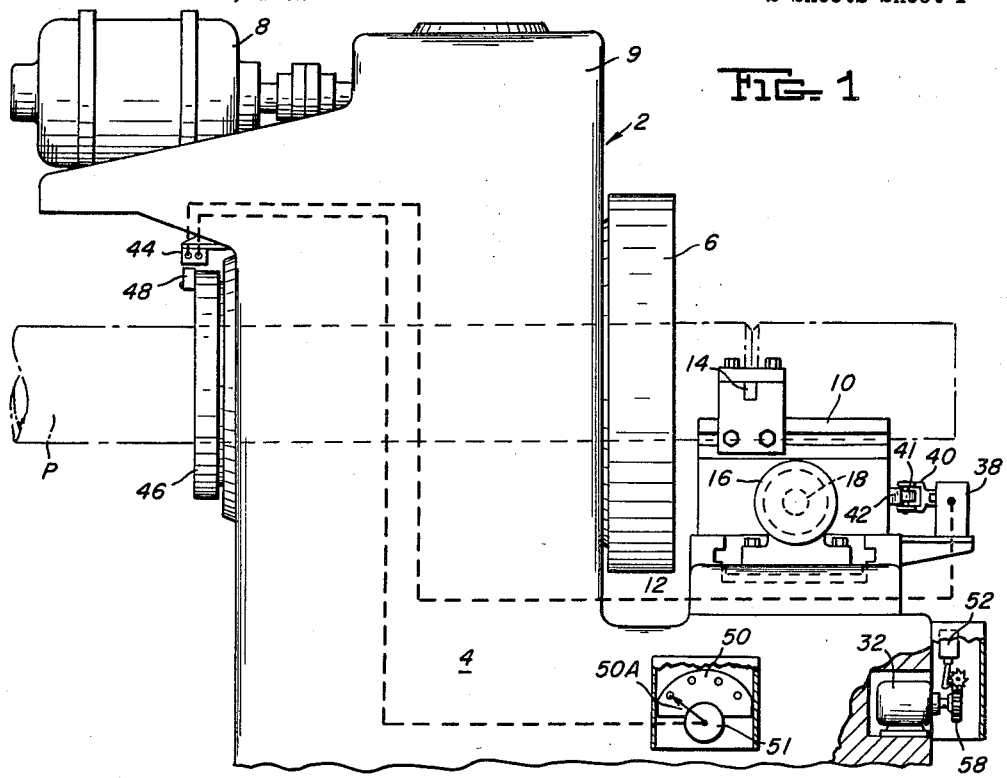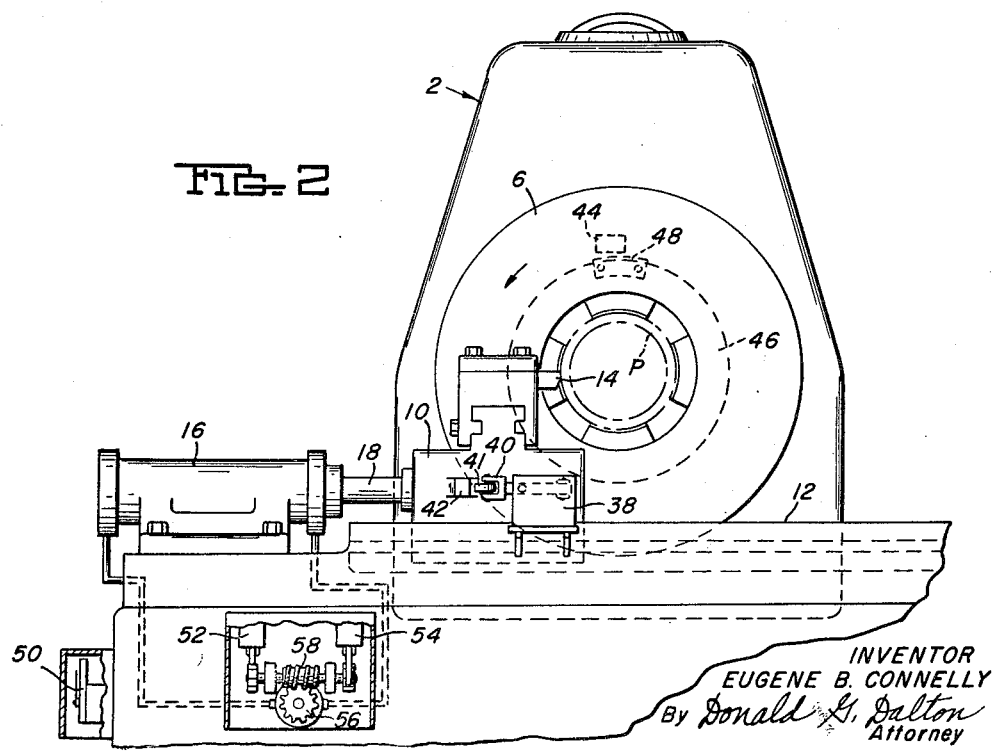

3,195,383
FEED CONTROL SYSTEM FOR A MACHINE TOOL
Eugene B. Connelly, Churchill Borough, Pa., assignor to United States Steel Corporation, a corporation of New Jersey
Filed Mar. 29, 1962, Ser. No. 183,611
3 Claims. (Cl. 82—21)

The present invention relates generally to machine tools and more particularly to a tool-feed control system especially suitable for machine tools having hydraulic tool feeds.

The control system of the invention is hereinafter described in connection with a pipe turning machine utilized for cutting the ends of pipe lengths, but it is to be understood that the invention is not limited to such application.

The use of hydraulic power for feeding tools of machine tools has become rather common, however, a serious disadvantage inherent in hydraulically fed machine tools, prior to my invention, was the lack of an accurate control for the hydraulic tool feed. The constant variations in hydraulic fluid temperature as well as variations caused by progressive tool wear affected the feeding rate. These variations, although gradual, were very difficult to compensate for in the machine operation. The feed per revolution of any machine tool must be properly controlled to achieve good tool life and high production. The fact that hydraulically fed machine tools with which I have been familiar have had no mechanical connection between the hydraulic feeding mechanism and the workpiece rotating mechanism has made it difficult to maintain proper coordination of the feed rate and workpiece rotation. Any change in speed of either the feeding mechanism or the workpiece rotation would cause the rate of feed per revolution to vary. Such variation was detrimental to efficient machine operation.

It is, accordingly, the primary object of my invention to provide an electric control system whereby the rate of tool feed of a hydraulically fed machine tool is automatically regulated in accordance with the revolutions of a workpiece being processed.

This and other objects will become more apparent after referring to the following specification and attached drawings, in which:

FIGURE 1 is a side elevation partly in section of a machine tool having the control system of the invention installed thereon;

FIGURE 2 is a front elevational view of FIGURE 1;

FIGURE 3 is an enlarged detail view of a portion of FIGURE 2;

FIGURE 4 is a side elevational view looking at the right-hand side of FIGURE 3;

FIGURE 5 is a schematic illustration of the hydraulic system of the tool feed of the machine tool on which the control system of the invention is installed;

FIGURE 6 is a schematic view in straight line form of the circuits of the control system of the invention; and FIGURE 7 is a schematic view showing relays employed in the circuits of FIGURE 6. The vertical spacing of relay contacts and coils in FIGURE 7 is similar to the vertical spacing of such contacts and coils in FIGURE 6.

It is to be understood that the rate of tool feed desired may vary with different machine tools, different operations of a machine tool, and varying types of material to be processed. For the purpose of illustration the control system of the invention is shown and described as regulating the tool feed of a pipe cutting machine wherein a tool feed rate of .010 inch per revolution of workpiece is desired.

In order to insure a clear understanding of my invention I interpose here a general description thereof.

Basically, the control system of my invention involves a feed measuring mechanism, an analyzing component, and a feed rate correction mechanism.

The feed measuring mechanism includes a first switch which is closed momentarily once each revolution of the workpiece. The switch closures are counted by the feed measuring mechanism during a predetermined measured amount of movement of the tool toward the workpiece. This movement of the tool is measured by a cam on the tool carriage which holds a second switch closed during the predetermined amount of movement of the tool toward the workpiece. Since the unit of tool feed will equal the length of tool movement during which the second switch is held closed, a very accurate determination of the rate of tool feed per revolution can be made by dividing the length of tool movement during which the second switch is held closed by the recorded revolutions. Experience has shown that the cam mentioned above should be short enough and in such a location that all of the measured movement of the tool is located within the actual area of the cutting operation of the tool.

The analyzing component of the system of the invention translates any indication of improper feed by the feed measuring mechanism into electrical impulses which actuate the feed rate correction mechanism to adjust the hydraulic feed control valve of the machine tool. In this manner, any of the changing conditions which influence the tool feed are automatically recognized and the feed rate automatically adjusted to compensate for the change.

Referring more particularly to the drawings reference character 2 designates generally a pipe-cutting machine tool having a frame 4 upon which is mounted a rotatable chuck 6 for concentrically holding a pipe length P adjacent its end. The chuck 6 is powered by a motor 8 through a gear reducer 9. A tool carriage 10 is slidably mounted on a way 12 on frame 4 for movement transversely of the continuation of the axial centerline of the chuck 6 toward and away from the pipe length P. A cutting tool 14 is carried by the carriage 10 at its forward end. A double-acting hydraulic cylinder 16 having a piston rod 18 projecting therefrom is mounted on frame 4 adjacent the rearward end of the carriage 10. The projecting end of piston rod 18 is connected with carriage 10 and cylinder 16 is actuated to feed the carriage 10 and tool 14 toward the pipe P to cut it or to move the carriage and tool away from the pipe after the cut has been made.

The system for supplying hydraulic fluid to the cylinder 16 is shown diagrammatically in FIGURE 5 and includes a sump or reservoir 20, a pump 22, a four-way valve 24, a line 26 extending from the valve 24 to the closed end of the hydraulic cylinder, a line 28 extending from the valve 24 to the open end of the cylinder 16, and a line 30 between the valve 24 and the sump 20. A flow control valve 32 is provided in the line 26 for regulating the flow of hydraulic fluid to the closed end of cylinder 16 to thereby regulate the speed of movement of carriage 10 toward the pipe P. A by-pass line 34 connected with line 26 is provided around the control valve 32. A check valve 36, which functions to conduct relief hydraulic fluid from cylinder 16 in one direction only away from the cylinder when fluid is introduced to the cylinder through line 28 is provided in the by-pass line.

The machine tool with hydraulic tool feed thus far described is conventional in structure and function and is not claimed as my present invention, the details of which will now be described.

The control system of my invention includes an electrical switch 38 having a spring-returned actuating arm 40 provided with a cam roller 41. The switch 38 is rigidly mounted on the frame 4 adjacent the carriage way 12 with the actuating arm 40 in the path of a cam 42 which projects from the tool carriage 10. A magnetic proximity switch 44 is mounted on the machine frame 4 adjacent the spindle 46 of chuck 6 and is connected in series with the switch 38. An actuator lug 48 is mounted on the spindle 46 and is adapted to momentarily actuate the proximity switch once upon each revolution of the chuck 6.

A step-relay coil 50 is connected in series with the proximity switch 44. The step-relay 50 is connected with solenoids 52 and 54 in an electrical circuit to be more fully described hereinafter.

Solenoids 52 and 54, which function as elements of the feed rate correction mechanism of the invention, are mounted on the frame 4 in spaced relation above the flow control valve 32. Other elements of the feed rate correction mechanism include a worm gear 56 keyed on the rotary actuating arm of the control valve, a worm 58 in mesh with gear 56, and star wheels 60 and 62 keyed on opposite ends of the worm shaft. Star wheel 60 is disposed below solenoid 52 and is engaged by a pawl 64 which is connected with and depends from the armature of solenoid 52. Star wheel 62 is located below solenoid 54 and is engaged by a pawl 66 which is connected with and depends from the armature of the solenoid 54. The pawls 64 and 66 engage their respective star wheels on opposite sides so that when solenoid 52 is energized its armature is retracted and pawl 64 rotates star wheel 60 a fraction of a revolution in the clockwise direction, and when solenoid 54 is energized its armature is retracted and pawl 66 rotates star wheel 62 a fraction of a revolution in counterclockwise direction. Clockwise rotation of star wheel 60 causes the worm gear of the control valve 32 to be turned to open the valve further and permit more pressure fluid to flow therethrough to the hydraulic cylinder 16 to thereby increase the rate of feed of tool 14 toward the pipe P. Counterclockwise rotation of star wheel 62 causes the worm gear of the control valve to be turned to close the valve partially so that flow of pressure fluid to cylinder 16 is reduced and the rate of feed of tool 14 toward pipe P is reduced.

Operation of the control system of the invention will be best explained and understood by reference to the electrical circuit of the invention shown diagrammatically in FIGURE 1, and which will now be described.

Reference characters L1 and L2 designate conventional power lines which supply electric current to the circuit of the invention. S1 indicates a manually operated start-cycle switch. Momentary closing of start cycle switch S1 energizes a relay coil 1R and causes closing of the normally open contact 1R1 of relay 1R. Relay coil 1R remains energized after switch S1 is opened by virtue of the circuit completed through closed contact 1R1 and a normally closed contact 2R2 of a relay coil 2R. This circuit serves the function of converting a momentary initiating electrical impulse into a sustained power supply to operate the mechanism through the remainder of the working cycle.

Closing of contact 1R1 also completes a circuit to and energizes a relay coil 6R. Energization of relay coil 6R causes its normally closed contact 6R1 to open to prevent premature actuation of solenoids 52 and 54, as will be more fully explained hereinafter.

The length of cam 42 on carriage 10 is a multiple of the feed rate per revolution desired. As set forth above, the desired feed rate is .010 inch per revolution of pipe P. For this feed rate I have found it preferable to use a cam length of .040 inch. Thus, the switch 38 will remain closed during a .040 inch portion of travel of the tool carriage 10 toward the pipe P. The cam 42 and switch 38 are relatively positioned so that the switch 38 is held closed by the cam-engaging actuating arm 40 while the cutting tool 14 is in actual operating area.

Closing of switch 38 completes a circuit to and energizes relay coil 2R through closed relay contact 1R1 and switch 38. Energization of relay coil 2R causes its normally open contact 2R1 to close so that relay coil 2R is locked in and remains energized through closed switch 38 and closed contact 2R1. Energizing of relay coil 2R also causes opening of its normally closed contact 2R2. Opening of contact 2R2 breaks the circuit to and de-energizes relay coil 1R.

The proximity switch 44, which closes momentarily once upon each revolution of chuck 6 and pipe P, is connected in series with switch 38 and with step-relay 50. While switch 38 remains closed a circuit is completed to step-relay 50 each time proximity switch 48 is closed. Step-relay 50 may be of any well known type, such for instance, as that presently on the market, manufactured by Guardian Electric Manufacturing Co., Chicago, Illinois, and known as "Guardian Relay MER 115."

Step-relay 50 is provided with an impulse motor 51 which moves the contact arm 50A of the relay progressively from one contact to the next each time the relay coil is energized by an electrical impulse from proximity switch 44. Thus the step-relay 50 will count and indicate the revolutions of P as long as switch 38 remains closed. after switch 38 opens, the position of the contact arm 50A will indicate number of revolutions of the pipe P which have occurred while the carriage was moving .040 inch. If the contact arm has moved to the fourth contact of step-relay 50, designated 50-3, from its starting position contact, designated 50-7, during the time switch 38 was closed, this would indicate that the tool had been fed a distance of .040 inch during four revolutions of pipe P or .010 inch per revolution which is the desired feed rate in this particular instance. If the movable contact arm 50A does not reach contact 50-3 before switch 38 is opened, this would indicate that the tool has been fed .040 inch toward the pipe P during less than four revolutions of the pipe P which would be a rate in excess of that desired. If the contact arm 50A travels to contact 50-4 during the time switch 38 remains closed, this would indicate that the pipe P had revolved five times while the tool 14 moved .040 inch toward the pipe, or a feed rate of less than the desired .010 inch per revolution.

Continuing the description of the operation of the circuit of the invention, while the contact arm 50A is at resting or initial position contacting step-relay contact 50-7 a circuit is completed to relay coil 7R and its normally closed contact 7R1 is opened. The first electrical impulse to reach step-relay coil 50 causes the contact arm 50A to leave its rest position on contact 50-7 and break the circuit to and cause de-energization of relay coil 7R. De-energization of relay coil 7R causes its contact 7R1 to close. When further impulses cause the contact arm to come to rest on contact 50-5 of the relay coil 50 a circuit is completed to relay coil 5R causing energization thereof. Energization of relay coil 5R causes its normally open contacts 5R1 and 5R2 to close. Closing of its contact 5R1 causes relay coil 5R to lock-in and remain energized. Current cannot flow past closed contact 5R2 because relay contact 6R1 is open and being held open by the circuit through switch 38 and closed relay contact 2R1 which keeps relay contact 6R1 energized.

Further electrical impulses from switch 44 to step-relay 50 will cause the contact arm 50A to move progressively from contact to contact until the tool carriage movement causes switch 38 to open. By this time, one of the following occurrences will have then taken place:

(1) Contact arm 50A will not have reached contact 50-3 of step relay 50. As explained above this will indicate excessive tool feed rate.

(2) Contact arm 50A will have reached or passed contact 50-3 of step-relay 50. This indicates proper feed rate. When arm 50A reaches contact 50-3, a circuit is completed to relay coil 3R causing energization thereof. Energization of relay coil 3R causes closing of its normally open contact 3R1 and locking-in of the relay coil 3R. Energization of relay coil 3R also causes closing of its normally open contact 3R2 and opening of its normally closed contact 3R3.

(3) Contact arm 50A will have reached or passed contact 50-4 of step relay 50. This indicates a feed rate less than that desired. When arm 50A touches contact 50-4 a circuit is completed to relay coil 4R causing energization thereof. When relay coil 4R is energized its normally open contacts 4R1 and 4R2 are closed and its normally closed contact 4R3 is opened. Closing of its contact 4R1 causes the relay coil 4R to lock-in and remain energized.

It will be noted that solenoid 52, which functions to increase the feed rate of carriage 10, is connected in series between L1 and L2 with relay contacts 5R2, 6R1, 3R2 and 4R2. Solenoid 54, which functions to decrease the feed rate of carriage 10, is connected in series between L1 and L2 with relay contacts 5R2, 6R1, 3R3 and 4R3.

With the opening of switch 38, relay coil 2R will be de-energized and in its contact 2R1 will open. This will interrupt the circuit to relay coil 6R causing its contact 6R1 to close. Since relay contact 5R2 is already closed, current can flow to solenoid 52 if relay contacts 3R2 and 4R2 are closed, or to solenoid 54 if relay contacts 3R3 and 4R3 are closed. The path taken by the current will be established by which of the three above-described conditions have been found to exist. If No. 1 is the condition found, then the path will be through closed contacts 3R3 and 4R3 so that the "decrease" solenoid 54 will be energized. If condition No. 2 exists, relay contacts 3R3 and 4R2 will be open so that neither of the solenoids is energized. If condition No. 3 exists, relay contacts 3R2 and 4R2 will have closed so that a circuit will be completed to "increase" solenoid 52 and it will become energized to increase the feed rate.

When relay coil 6R is de-energized as explained hereinbefore, its contact 6R1 closes causing a circuit to be completed between L1 and L2 to a time delay relay coil TD through closed contacts 5R2 and 6R1. The time delay coil is preferably set for from one to two seconds to allow the solenoids 52 and 54 to be fully operative. At the end of the interval, contact TDI of the time delay coil closes and completes a circuit to a step-relay electrical reset SRR to energize the same. Energization of reset SRR causes contact arm 50A to be returned to its initial position resting on contact 50-7 of step relay 50. With arm 50A in this position, relay coil 7R is energized and its normally closed contact 7R1 is opened. Opening of relay contact 7R1 causes de-energization of all relay coils of the circuit as well as the time delay coil and in this way the control system of the invention is reset preparatory to the next cutting operation.

Although I have shown a step-relay as the means for counting or indicating the number of revolutions of the workpiece per unit of tool feed, it will be understood that other means may be used for this purpose, such as a rotating cam associated with a contact-making cam roller.

It will be further understood that the length of the tool carriage cam 42 can be made slightly longer than an even multiple of the desired feed rate per revolution of workpiece desired so as to compensate for the varied starting position of the proximity switch actuator lug 48. This will insure, for example, that the contact arm 50A will have contacted contact 50-3 after the chuck has rotated four complete revolutions.

While one embodiment of my invention has been shown and described, it will be apparent that other adaptations and modifications may be made without departing from the scope of the following claims.

I claim:

1. In a machine for processing an elongated workpiece, said machine including a frame, a chuck rotatably mounted on said frame for concentrically holding said workpiece adjacent one end and rotating the same, means for rotating said chuck, a tool carriage mounted on said frame for movement transversely of a continuation of the axial centerline of said chuck toward and away from the workpiece, and hydraulic feed means mounted on said frame and connected with said carriage for moving said carriage toward and away from the workpiece, the improvement therewith of a control device for automatically regulating said feed means, a switch mounted on said frame in the path of said carriage, means for maintaining said switch closed during a predetermined portion of the carriage travel toward the workpiece, a multiple-position contact-making mechanism connected with said switch, means for actuating said mechanism in accordance with successive rotations of the chuck when said switch is closed during said predetermined portion of the carriage travel toward the workpiece, and means actuating said control device in response to the position of said contact-making mechanism at the end of said predetermined travel when said switch is released.

2. Apparatus as defined in claim 1 characterized by said contact-making mechanism being a step relay and a magnetic proximity switch controlling said relay actuated by rotation of said chuck.

3. Apparatus as defined by claim 1 characterized by said control device being a valve, and said control device actuating means including solenoids for moving said valve in opposite directions.

References Cited by the Examiner
UNITED STATES PATENTS 1,961,090   5/34   Smith et al.
2,561,724   7/51   Bickel.
2,913,662   11/59  Hogan _____ 324—70

WILLIAM W. DYER, Jr., *Primary Examiner.*